US005784563A

United States Patent [19]

Marshall et al.

[11] Patent Number: 5,784,563

[45] Date of Patent: Jul. 21, 1998

[54] METHOD AND SYSTEM FOR AUTOMATED RECONFIGURATION OF A CLIENT COMPUTER OR USER PROFILE IN A COMPUTER NETWORK

[75] Inventors: Aaron W. Marshall, Nashville; Paul S. Pruett, Columbia; Joel R. Jensen, Franklin, all of Tenn.

[73] Assignee: Electronic Data Systems Corporation, Plano, Tex.

[21] Appl. No.: 652,869

[22] Filed: May 23, 1996

[51] Int. Cl.⁶ .................................................. G06F 17/00
[52] U.S. Cl. ................................................... 395/200.51
[58] Field of Search ...................... 395/200.51, 651, 395/652, 653, 712

[56] References Cited

U.S. PATENT DOCUMENTS 5,361,360  11/1994  Ishigami et al. ................ 395/652
5,421,009  5/1995  Platt ............................... 395/200.51
5,555,416  9/1996  Owens et al. ...................... 395/652
5,623,604  4/1997  Russell et al. ................... 395/200.51

*Primary Examiner*—Ellis B. Ramirez
*Attorney, Agent, or Firm*—David G. Wille; L. Joy Griebenow

[57] ABSTRACT

A method and system are disclosed for automated reconfiguration of a client computer or user profile in a computer network. The invention allows a user to automatically reconfigure a client computer or user profile using computer software running on the client computer. The method of the invention comprises presenting a user of the client computer with a number of reconfiguration options using a user interface. The user may then select one or more of the reconfiguration options using the user interface. After receiving the user's input, a script is executed corresponding to the user's selection wherein the script causes a reconfiguration of the client computer or user profile.

26 Claims, 1 Drawing Sheet

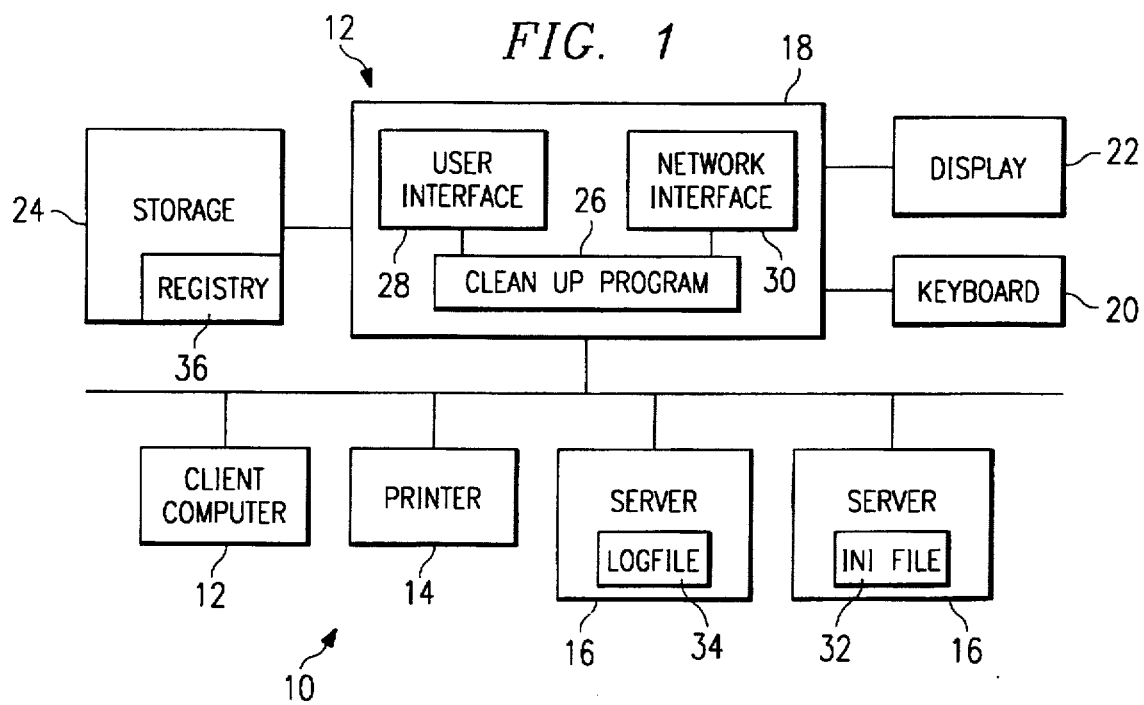
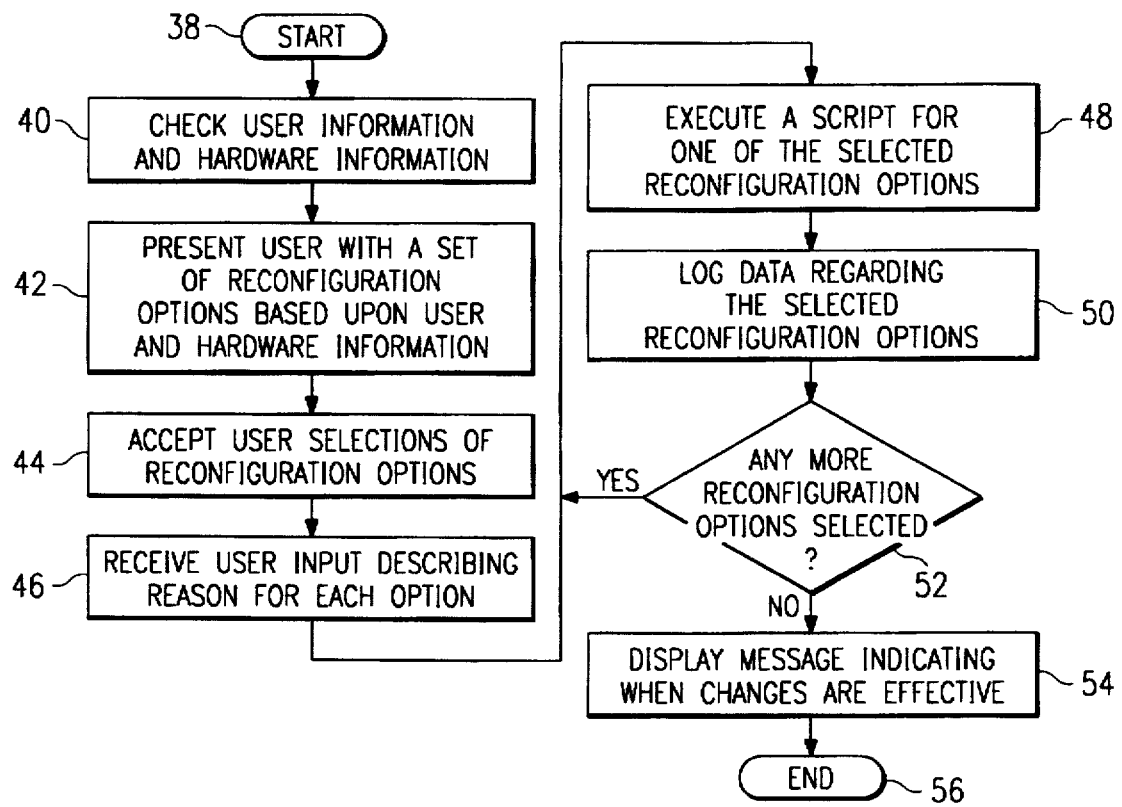

5,784,563

METHOD AND SYSTEM FOR AUTOMATED RECONFIGURATION OF A CLIENT COMPUTER OR USER PROFILE IN A COMPUTER NETWORK

TECHNICAL FIELD OF THE INVENTION

This invention relates generally to computer networks and more particularly to a method and system for reconfiguring a client computer or user profile in a computer network.

BACKGROUND OF THE INVENTION

The proliferation of computer networks has increased the demand for service of those computers. Many businesses have computer support staff that keep computer networks operating, upgrade software on those networks, and diagnose and resolve the problems of individual users. Some companies have developed help desks to deal with the many problems of network computer users.

Technical support staff for computer networks have discovered that individual computer users frequently cause an accidental reconfiguration of their computer or user profile which ends up damaging or destroying some of the functionality of the software on that computer. For example, a user may accidentally delete a file, move a file to an improper directory, or accidentally corrupt a registry such as a Windows '95™ registry. These problems may also be caused by the software itself as opposed to errors by the computer user.

The standard methods of resolving these types of problems and of installing new software require the technical support team for the computer network to visit the individual computer user in order to diagnose and resolve the problem. Often, the quickest way to resolve one of these problems requires reinstallation of software. Diagnosing failures and resolving problems can be a very time-consuming and expensive task, especially in a company with highly leveraged support staff ratios.

Over time, the technical support staff for a computer network will repeatedly encounter some of the same problems. Often, a recurring problem may be solved in the same way each time. Although the experience of the technical support team may reduce the time for diagnosis, the team must still resolve the problem by time-consuming reconfiguration of a user's computer. A member of the technical support team therefore, may spend valuable time remedying even routine problems.

SUMMARY OF THE INVENTION

The invention comprises a method and system for automatically reconfiguring a client computer or user profile in a computer network using computer software available to the client computer. In accordance with the method of the invention, a user of a client computer is presented with a plurality of reconfiguration options through a user interface. The user then inputs data corresponding to a selection of at least one of the plurality of reconfiguration options through the user interface. Then, a script is executed corresponding to the selection by the user wherein the script causes a reconfiguration of the client computer or user profile.

The invention has several important technical advantages. The invention allows users in a client server environment to fix common problems on their own without a personal visit by technical support personnel. Because users can remedy their own routine problems, technical support personnel can spend their time solving more difficult problems.

The invention may increase productivity both of the technical support personnel and of the users of the client server network. The productivity of technical support personnel may increase as they can remedy many problems through instructions over the phone by instructing a user to use the invention to solve his problem. Thus, technical support personnel need not visit a computer user in person to solve his problem. In addition, a computer user's productivity may increase because he will not suffer from a lengthy down time waiting for a member of the technical support team to come and fix his computer. Instead, the computer user can fix many problems himself.

The invention also allows an efficient way for the technical support staff of a computer network to install new software packages and upgrades to existing software packages. Rather than visit each individual client computer to install new software, the technical support staff can include a script accessible by the invention to allow users to install the software themselves. The technical support staff can write the script such that the user does not have to decide which installation options to choose from. Instead, the technical support staff can select the proper installation options ahead of time, saving the user time and confusion.

The invention allows automatic recording of each of the actions taken by one of the users of the client server network. This feature allows the technical support staff to build up a database identifying common problems and whether those problems were successfully remedied or not by the invention. The invention also allows the technical support staff to control which reconfiguration options are presented to various users based upon their user privileges.

BRIEF DESCRIPTION OF THE DRAWINGS

For a more complete understanding of the present invention and the advantages thereof, reference is now made to the following descriptions taken in conjunction with the accompanying drawings in which:

FIG. 1 illustrates a system constructed in accordance with the invention for reconfiguring a client computer or user profile in a client server computer network; and FIG. 2 illustrates a flow chart of the operation of the invention.

DETAILED DESCRIPTION OF THE INVENTION

The preferred embodiment of the present invention and its advantages are best understood by referring to FIGS. 1 and 2 of the drawings, like numerals being used for like and corresponding parts of the various drawings.

FIG. 1 illustrates a system for reconfiguring a client computer 12 or user profile in a computer network 10. Computer network 10 comprises one or more client computers 12 connected to one or more servers 16. Network 10 may also include other types of devices such as printer 14.

Client computer 12 may be any type of general purpose computer. In this embodiment, client computer 12 comprises processing unit 18, keyboard 20, display 22, and storage 24. One or more of these components could be omitted from client computer 12 and other components could be added. Processing unit 18 is connected to each of the remaining elements. Display 22 can be used to output data from client computer 12. Client computer 12 can receive input from a user through keyboard 20. Client computer 12 may communicate with other devices in computer network 10 using network interface 30. Data and software used by client computer 12 may be stored in memory (not explicitly shown) contained in processing unit 18 or in storage 24. Storage 24 may include a hard disk drive, floppy disk drive, magnetic tape drive, optical storage, and/or any other type of computer storage device. Client computer 12 will normally be a personal computer such as a personal computer running the Microsoft DOS™ or Microsoft Windows™ operating systems. Computer 12 may also be any other type of personal computer, microcomputer, computer workstation, terminal, etc. Similarly, servers 16 may be any type of general purpose computer.

As illustrated in FIG. 1, client computer 12 is executing cleanup program 26. In this embodiment, cleanup program 26 is an application program. Cleanup program 26 could also be a part of the operating system or a part of another application. Cleanup program 26 interfaces with a user of client computer 12 through user interface 28. Cleanup program 26 interfaces with other devices connected to computer network 10 through network interface 30. Cleanup program 26, user interface 28, network interface 30 are stored in the physical or virtual memory of processing unit 18 while they are executing. Software may also be permanently stored on storage 24. During its execution, cleanup program 26 may interact through network interface 30 with INI file 32 or log file 34. Cleanup program 26 may also access registry 36 which is stored on storage 24.

According to the present invention, cleanup program 26 allows a user of client computer 12 to reconfigure client computer 12 or the profile of the user. In one common use of the invention, cleanup program 26 will be used to recover from problems caused by the user of client computer 12 or by software running on client computer 12. For example, if client computer 12 is running the Windows '95™ operating system available from Microsoft Corporation, the Windows '95™ registry 36 may get corrupted or lose the default entries stored within it. Cleanup program 26 can be used to fix the Windows '95™ registry 36. Also, users of client computer 12 or software running on client computer 12 may accidentally delete or move files to an unknown location causing application programs running on client computer 12 to malfunction. When this occurs, cleanup program 26 allows the user of client computer 12 to remedy these problems automatically. Also, cleanup program 26 can be used to install new software onto client computer 12 or upgrade software already residing on client computer 12.

In performing reconfiguration of client computer 12, cleanup program 26 first presents a user of client computer 12 with a number of reconfiguration options through user interface 28. These reconfiguration options may include any activity that causes a reconfiguration of client computer 12 or the user's user profile such as editing the Windows '95™ registry 36 of client computer 12, refreshing default printer connections, creating or deleting files, creating or deleting directories, adjusting the user's startup options, installing new software, upgrading software, etc.

Cleanup program 26 only presents the user of client computer 12 with those reconfiguration options that the particular user is privileged to use. The technical support staff for client network 10 can control a particular user's access to various software, data, and/or network devices by assigning users of computer network 10 to specific user groups. Because the technical support staff for computer network 10 may desire to restrict the ability of certain users to employ certain reconfiguration options available through cleanup program 26, each individual reconfiguration option may be restricted to one or more particular network user groups. Also, because certain software may not run on certain client computers 12, the reconfiguration options may also be restricted based upon the operating system running on client computer 12 or based upon the type of computer being reconfigured. For example, certain 32 bit software applications will malfunction if a user of client computer 12 attempts to run them on a client computer 12 that is not running a 32 bit operating system. Also, depending upon whether client computer 12 is a lap top or desk top computer, a different set of reconfiguration options may be presented.

In order to determine which reconfiguration options to present to the user of client computer 12, therefore, cleanup program 26 may need to obtain information about the user of client computer 12, information about client computer 12 itself, or both. Cleanup program 26 normally may obtain information about client computer 12 by accessing the information on storage 24. To obtain information about the user of client computer 12, cleanup program 26 uses network interface 30 to access information about the user stored on one or more servers 16. Normally, information about a user's user privileges will be stored in a database contained on one of these servers 16. Alternatively, user privileges could be stored in a database in storage 24.

After the user is presented with the reconfiguration options, he may input data using keyboard 20 or any other input device to indicate a selection of one or more of the reconfiguration options. Cleanup program 26 receives the input from keyboard 20 through user interface 28. Cleanup program 26 then processes the received input to determine which reconfiguration options the user has selected.

Based upon the selected reconfiguration options, cleanup program 26 executes a script corresponding to the selection by the user. Each reconfiguration option has its own script which causes a reconfiguration of the client computer or user's user profile. For purposes of this application, the term "script" has a broad meaning, referring to a collection of one or more high level commands. In this embodiment, each script is merely a section of a Windows '95™ initialization (INI) file. Each of the commands in the script in this embodiment corresponds to an entry in a particular section of the INI file. The term "script," however, is broad enough to encompass an interpreted script file, a batch file, a software procedure, or any other collection of commands used for reconfiguration of the client computer 12. Here, the scripts are sections of INI file 32 stored on a server 16. INI file 32 could also be stored on storage 24 of a client computer 12.

Cleanup program 26 causes the execution of each script corresponding to the selection by the user. Although the scripts are executed in response to their selection by the user, the changes caused by the scripts may not take effect until a later time. In this embodiment, there are three options for the time at which the changes may take effect. The changes caused by each section of INI file 32 may take effect immediately, after the next log-on to the system by the current user of client computer 12, or after the next time that the particular client computer 12 is restarted. The time that the changes take effect may depend upon the operating system. In this embodiment, cleanup program 26 provides the user of client computer 12 with information through user interface 28 and display 22 indicating when the particular reconfiguration option will be effective. In other embodiments of the invention, the changes may be effective at various other times.

As each reconfiguration option selected by the user is processed, cleanup program 26 also performs a logging function so that a periodic review of the usage of cleanup program 26 can occur, root causes of problems can be identified, and a history of changes to a particular computer can be automatically recorded for future reference by the technical support staff for computer network 10. As cleanup program 26 processes each reconfiguration option selected by the user, it prompts the user to explain why he has chosen a particular reconfiguration option. The user may be prompted once for each option selected, or simply prompted a total of one time no matter how many options the user has selected. This embodiment uses the second option. After entering this information, cleanup program 26 will log the following information to log file 34 through network interface 30: the user's user identification, the actions performed by the script, the date and time that the actions were performed, the comments input by the user explaining why the particular reconfiguration option was chosen, the help desk call identification number and a client computer identification number. The help desk call identification number can be used for quality control by the technical support staff for computer network 10. If the user of client computer 12 has contacted a help desk to receive instruction on which reconfiguration option to choose, the help desk can provide the user with a computer-generated help desk call identification number to allow the technical support staff to determine whether the help desk is providing accurate information. The client computer identification number identifies the particular client computer 12 that the user was using when he chose the reconfiguration option. Other data may be logged for each reconfiguration option without departing from the scope and teachings of the invention. Also, some data could be omitted. Although in this embodiment, cleanup program 26 logs the information in a database stored in log file 34 on server 16 using network interface 30, log file 34 could also reside on any other server 16 or any one of the client computers 12. Any type of database can be used for log file 34.

FIG. 2 illustrates an example software process that can be used to implement cleanup program 26. This process also illustrates the operation of cleanup program 26 of FIG. 1. In step 38, the process begins with initialization. Next, in step 40, cleanup program 26 obtains characteristics of client computer 12 and characteristics of the user's network account. Normally, cleanup program 26 obtains the information about client computer 12 from data stored on storage 24. Cleanup program 26 normally obtains information about the user of client computer 12 from a database of network information stored on server 16, which cleanup program 26 accesses through network interface 30.

After obtaining the proper user information and/or hardware information, cleanup program 26 presents the user of client computer 12 with a set of reconfiguration options based upon the user information and/or hardware information. Cleanup program 26 presents these options to the user of client computer 12 using user interface 28 to display the options on display 22. In this embodiment, a list of options is displayed in a window of the type commonly used with the Windows™ operating system available from Microsoft. To determine which options to present to the user, cleanup program 26 retrieves privilege information from INI file 32. INI file 32 contains each of the scripts corresponding to the reconfiguration options as well as information as to which users and computers are privileged to execute each specific reconfiguration option. Cleanup program 26 obtains this information from INI file 32 using network interface 30. The reconfiguration option list in the window on display 22 includes information indicating the time at which each reconfiguration option is effective. In this embodiment, the user of client computer 12 selects one or more reconfiguration options using a pointing device such as a mouse (not explicitly shown) or keyboard 20.

In step 44, cleanup program 26 accepts selections of reconfiguration options chosen by the user. The user input is received by cleanup program 26 through user interface 28. The user may select only one or may select a plurality of reconfiguration options.

Next, in step 46, cleanup program 26 prompts the user of client computer 12 using user interface 28 and display 22 for information describing the reason why the user has chosen a particular reconfiguration option. Alternatively, step 46 may be omitted. After obtaining this information, execution continues in step 48. In step 48, cleanup program 26 executes a script for one of the selected reconfiguration options. As discussed above, each script is a section of a Windows™ INI file 32. Each section of the INI file 32 may make changes that are effective immediately, effective upon the next restart of client computer 12, or effective upon the next log-on by the current user of client computer 12. Next, in step 50, cleanup program 26 logs data to log file 34 regarding the selected reconfiguration option. The logged data is stored on server 16 using network interface 30. In step 52, cleanup program 26 determines whether there are any more reconfiguration options selected. If so, execution proceeds back to step 48, otherwise the procedure executes step 54.

In step 54, a message is displayed on display 22 informing the user of client computer 12 when the changes are effective. Step 54 may be skipped if all changes are effective immediately. In this embodiment, only one message is displayed indicating when the latest effective change becomes effective. For example, if one change is effective immediately, two at next log-on, and one at next restart, the message will indicate that the changes are effective at the next restart. Alternatively, a message could be displayed indicating when each reconfiguration option becomes effective. The process then terminates in step 56.

Although the present invention has been described in detail, it should be understood that various changes, substitutions, and alterations can be made hereto without departing from the spirit and scope of the invention as defined by the appended claims.

What is claimed is:

1. A method for automated reconfiguration of a client computer in a computer network, comprising:
presenting a user of the client computer with a plurality of reconfiguration options through a user interface;
receiving a data input from the user, the data input corresponding to a selection of at least one of the plurality of reconfiguration options through the user interface;
executing a script corresponding to the selection wherein the script causes a reconfiguration of the client computer.

2. The method of claim 1 wherein the script is stored on the client computer.

3. The method of claim 1 wherein the script is stored on a server coupled to the client computer.

4. The method of claim 1, wherein the presenting step further comprises:
presenting the user of the client computer with a subset of the plurality of reconfiguration options through a user interface, the number of members in the subset depending upon at least one characteristic of the client computer.

5. The method of claim 1, wherein the presenting step further comprises:

presenting the user of the client computer with a subset of the plurality of reconfiguration options through a user interface, the number of members in the subset depending upon at least one of the user's account characteristics.

6. The method of claim 5 wherein the number of members in the subset depends upon the user's membership status in at least one network user group.

7. The method of claim 1, wherein the executing step further comprises executing the script immediately in response to the selection.

8. The method of claim 7 wherein the reconfiguration of the client computer causes changes to the client computer that take effect after the next logon by the user of the client computer.

9. The method of claim 7 wherein the reconfiguration of the client computer causes changes to the client computer that take effect after the next restart of the client computer.

10. The method of claim 1, wherein the reconfiguration of the client computer comprises an action selected from a group consisting of altering the user's registry file, adding a directory, deleting a directory, refreshing the user's printer connection settings, adding a file, deleting a file, adjusting startup options of a start menu, and installing an application program.

11. The method of claim 10, further comprising:

presenting the user of the client computer with a subset of the plurality of reconfiguration options through a user interface, the number of members in the subset depending upon the user's membership status in at least one network user group; and logging a plurality of data items to a database, the data items indicating that the user has executed the script.

12. The method of claim 1, further comprising:

logging a plurality of data items to a database, the data items indicating that the user has executed the script.

13. The method of claim 12, wherein the data items include the user's user identification, the actions performed by the script, the date and time that the actions were performed, and a client computer identification number.

14. The method of claim 13, wherein the data items include a help desk call identification number and comments of the user.

15. A system for automated reconfiguration of a client computer in a computer network, comprising:

a user interface operable to present a user of the client computer with a plurality of reconfiguration options and receive a data input from the user;

a procedure interactive with the user interface running on the client computer and operable to execute a script in response to the data input, wherein the script corresponds to one of a plurality of reconfiguration options and wherein the script causes a reconfiguration of the client computer.

16. The system of claim 15, wherein the procedure controls the presentation by the user interface of the plurality of reconfiguration options such that the user interface presents a subset of the plurality of reconfiguration options to the user of the client computer, the number of members in the subset depending upon at least one of the user's account characteristics.

17. The system of claim 16, wherein the number of members in the subset depends upon the user's membership status in at least one network user group.

18. The system of claim 15, wherein the procedure is further operable to log a plurality of data items to a database, the data items indicating that the user has executed the script.

19. The system of claim 18, wherein the data items include the user's user identification, the actions performed by the script, the date and time that the actions were performed, comments of the user, a help desk call identification number, and a client computer identification number.

20. The system of claim 15, wherein the reconfiguration of the client computer comprises an action selected from a group consisting of altering the user's registry file, adding a directory, deleting a directory, refreshing the user's printer connection settings, adding a file, deleting a file, adjusting startup options of a start menu, and installing an application program.

21. The system of claim 15, wherein the procedure controls the presentation by the user interface of the plurality of reconfiguration options such that the user interface presents a subset of the plurality of reconfiguration options to the user of the client computer, the number of members in the subset depending upon at least one of the user's account characteristics;

wherein the procedure is further operable to log a plurality of data items to a database, the data items indicating that the user has executed the script; and wherein the reconfiguration of the client computer comprises an action selected from a group consisting of altering the user's registry file, adding a directory, deleting a directory, refreshing the user's printer connection settings, adding a file, deleting a file, adjusting startup options of a start menu, and installing an application program.

22. A method for automated reconfiguration of a user profile for a user of a computer network, comprising:

presenting a user of a client computer with a plurality of reconfiguration options through a user interface;

receiving a data input from the user, the data input corresponding to a selection of at least one of the plurality of reconfiguration options through the user interface;

executing a script corresponding to the selection wherein the script causes a reconfiguration of the user profile.

23. The method of claim 22, wherein the presenting step further comprises:

presenting the user of the client computer with a subset of the plurality of reconfiguration options through a user interface, the number of members in the subset depending upon at least one of the user's account characteristics.

24. The method of claim 23, further comprising:

logging a plurality of data items to a database, the data items indicating that the user has executed the script.

25. The method of claim 22, further comprising:

logging a plurality of data items to a database, the data items indicating that the user has executed the script.

26. The method of claim 25, wherein the data items include the user's user identification, the actions performed by the script, the date and time that the actions were performed, and a client computer identification number.

* * * * *